US012621172B2

(12) United States Patent
Haase et al.

(10) Patent No.: US 12,621,172 B2
(45) Date of Patent: May 5, 2026

(54) METHOD FOR VERIFYING A FIRST TIME RECORDING UNIT OF A FIELD DEVICE IN AUTOMATION TECHNOLOGY

(71) Applicant: Endress+Hauser Conducta GmbH+Co. KG, Gerlingen (DE)

(72) Inventors: Björn Haase, Stuttgart (DE); Thomas Alber, Stuttgart (DE); Oliver Durm, Benningen am Neckar (DE); Roman Griesser, Gerlingen (DE); Martin Lohmann, Gerlingen (DE); Stefan Robl, Hünxe (DE); Karsten Traub, Bietigheim-Bissingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 45 days.

(21) Appl. No.: 18/910,870

(22) Filed: Oct. 9, 2024

(65) Prior Publication Data

US 2025/0119306 A1     Apr. 10, 2025

(30) Foreign Application Priority Data

Oct. 9, 2023    (DE) ..................... 10 2023 127 518.6

(51) Int. Cl.
*H04L 9/32*       (2006.01)
*G06F 21/30*      (2013.01)

(52) U.S. Cl.
CPC .......... *H04L 9/3297* (2013.01); *H04L 9/3213* (2013.01); *G06F 21/305* (2013.01)

(58) Field of Classification Search
CPC .... H04L 9/3297; H04L 9/3213; G06F 21/305
See application file for complete search history.

(56) References Cited

U.S. PATENT DOCUMENTS

2021/0173355 A1*  6/2021  Tang .................. H04L 41/0866
2023/0152141 A1*  5/2023  Venkateswaran ...... G06Q 10/20
                                                            702/100

* cited by examiner

*Primary Examiner* — Huan V Doan
(74) *Attorney, Agent, or Firm* — Kelly J. Smith; Endress+Hauser (USA) Holding, Inc.

(57) ABSTRACT

A method for verifying a first time recording unit of a field device that supplies the field device with a first date and/or a first time. The method includes receiving a ticket at the field device that comprises cryptographically secured information and a time stamp. The time stamp is obtained from a second time recording unit and contains a second date and/or second time. The method includes carrying out a trust assessment of the time stamp, wherein the trustworthiness of the second time recording unit is checked against the first time recording unit. If the trust assessment shows that the second time recording unit is more trustworthy than the first time recording unit, the method includes comparing the first date or the first time with the second date or the second time, and creating a warning message if a deviation greater than a predetermined factor is determined.

11 Claims, 1 Drawing Sheet

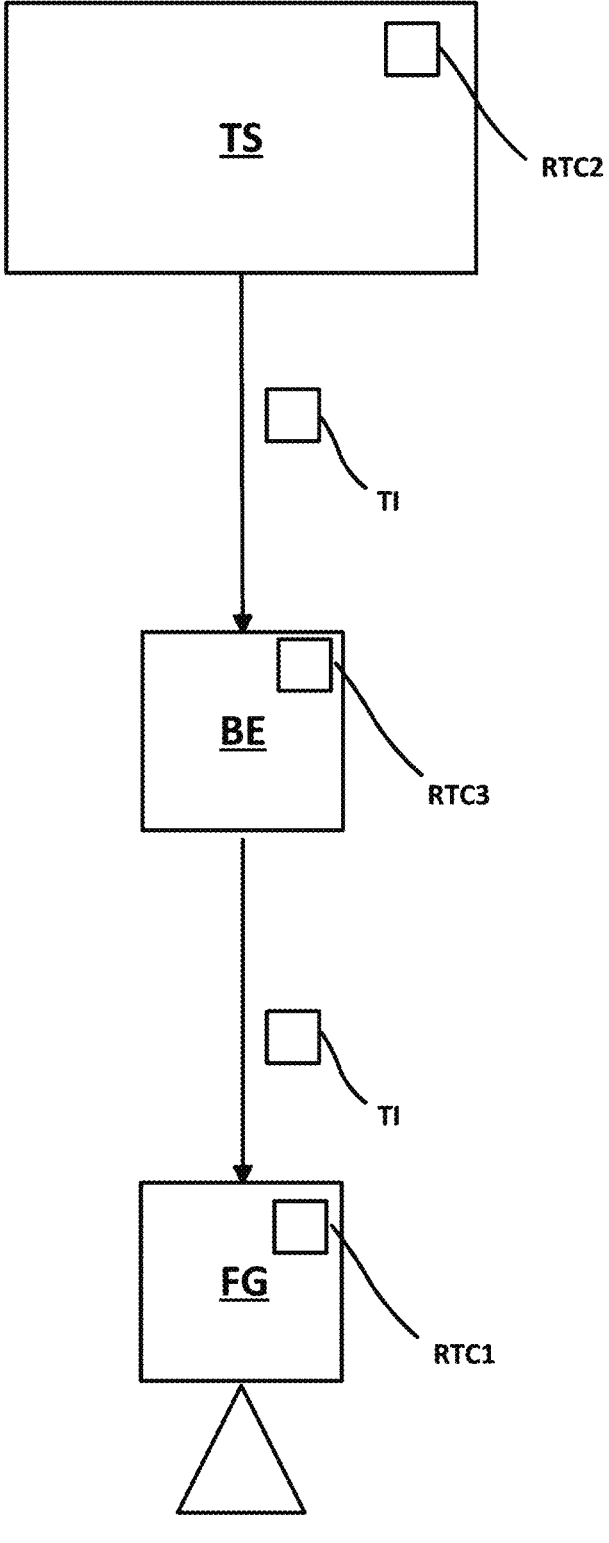

METHOD FOR VERIFYING A FIRST TIME RECORDING UNIT OF A FIELD DEVICE IN AUTOMATION TECHNOLOGY

CROSS-REFERENCE TO RELATED APPLICATION

The present application is related to and claims the priority benefit of German Patent Application No. 10 2023 127 518.6, filed on Oct. 9, 2023, the entire contents of which are incorporated herein by reference.

TECHNICAL FIELD

The present disclosure relates to a method for verifying a first time recording unit of a field device of automation technology, wherein the time recording unit supplies the field device with a first date and/or with a first time.

BACKGROUND

Field devices that are used in industrial installations are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems (DCS) or control units, such as an SPC (stored program control). The superordinate units are used for, among other things, process control, process visualization, and process monitoring, as well as commissioning of the field devices. The measured values recorded by the field devices, such as by sensors, are transmitted via the respective bus system to a (or in some cases a plurality of) superordinate unit(s). In addition, data transmission from the superordinate unit via the bus system to the field devices is also required, such as for configuration and parameterization of field devices and for controlling actuators.

Protocols such as the Internet Network Time Protocol (NTP, RFC 958) are known for the distribution of time information and the synchronization of clocks, but they require a direct IP network connection between the device and the time server, which is not usually available in the case of field devices.

Mobile control units can also be used to operate field devices that have implemented an FDT frame application. For example, there are control units that are connected to the fieldbus network. However, the control unit can also communicate with the field devices via a wireless communications connection, in particular based upon a Bluetooth standard. The applicant produces and sells devices which, as so-called Bluetooth gateways, allow the control units to be coupled to the field devices. The field device is connected to a Bluetooth gateway via wires, in particular using the HART or CDI communication standards. Alternatively, the field devices themselves have their own Bluetooth interfaces.

In contrast to field devices, operating units can have at least temporary access to a network infrastructure and can use mechanisms such as those listed in RFC 958 for synchronizing their clocks.

If a mobile device, such as a smartphone or tablet, is used as a control unit for wireless communication with the field devices, application programs, so-called apps, are available which make the operating functions for the field device available to the mobile device.

In industrial environments, most of the installed field devices have no or only very basic protection against unauthorized access. In these field devices, all device parameters can usually be accessed directly or, for example, after entering an unlock code. As a result of the Federal Security Act (Bundessicherheitsgesetz) in Germany, more and more field devices are coming onto the market that have individual user accounts and role-based authorization. For access via a user interface or machine interface, an, in a certain sense "permanent," authorization is required, which is usually granted by prior authentication. The authorization must be chosen in such a way that the access user has (permanently) all the authorizations they need to carry out their tasks.

In order to reduce the administrative effort for the administration of the individual field devices to an acceptable level, there are isolated efforts to centralize administration, as has been common practice in the IT sector for years with respect to IT devices (for example, printers, workstations, etc.). An example of such a concept is disclosed in DE 10 2018 1026 08 A1, in which a transport means is provided to which user data are transferred from a user database, wherein after checking the user data, access to the field device is granted.

There are also ideas for limiting the access permissions required by people to a minimum. DE 102019131860 A1, for example, discloses providing a digital order ticket which is transferred from a server to the mobile device, which order ticket contains the access rights and the authorized tasks for the field device. This order ticket is transmitted when the connection is established with the field device. If authorization is available, the tasks contained in the order ticket, such as parameterization actions or execution of functional tests, can be processed with the field device.

In the case of so-called "asynchronous communication" in particular, it is provided that the order tickets are not transmitted directly, e.g., via a network connection, from the issuing unit, such as a ticket server or a user database, to the field device, but to the transport means described above (e.g., a USB stick or a mobile device such as a smartphone or a tablet). The transport means then transmits the order ticket to the field device. For example, this can be effected by a user inserting the USB stick with the order ticket into a corresponding interface on the field device and reading the data from the order ticket there.

Due to the transfer route by the transport means, it is not guaranteed that the order tickets will arrive at the field device in the order in which they were created. For example, a first order ticket can be created by the ticket server with the information "The tablet with the public key XYZ belongs to the industrial plant and is authorized to access plant part A-Signed by the ticket server on Jul. 13, 2023."

For example, a second order ticket could be created with the information "The tablet with the public key XYZ was reported as stolen and is no longer authorized for access-Signed by the ticket server on Oct. 10, 2023."

As can be seen from the above example, the time sequence of instructions for order tickets is a critical task, e.g., because, as a rule, an order ticket issued later must be given priority over an order ticket issued earlier.

Field devices have a system time. This is often provided via an operating hours counter (a logical clock), which does not provide the real time. As a rule, however, field devices have their own real time clocks, which can also be buffered in the event of power failures using batteries, for example. However, in the event of empty battery buffers or power failures, situations may arise in which the field device's own real time clock cannot be trusted. Sporadically occurring or systematic timing deviations with a continuous operating time can also lead to a deviation between the time provided by the real time clock and the actual correct time.

SUMMARY

Based on this problem, the present disclosure is based on the object of specifying a method that makes it possible to make a statement on the correct time interpretation of order tickets arriving at a field device.

The present disclosure is achieved by a method for verifying a first time recording unit of a field device of automation technology, wherein the time recording unit supplies the field device with a first date and/or with a first time, comprising: receiving a ticket at the field device, wherein the ticket comprises at least cryptographically secured information and a time stamp, wherein the time stamp is obtained from a second time recording unit, and wherein the time stamp contains a second date and/or second time; carrying out a trust assessment of the time stamp contained in the ticket, wherein the trustworthiness of the second time recording unit is checked against the first time recording unit in the course of the trust assessment; in the event that the trust assessment shows that the second time recording unit is more trustworthy than the first time recording unit: comparing the first date or the first time with the second date or the second time, and creating a warning message if a deviation greater than a predetermined factor is determined between the first date or first time and the second date or second time.

Thus, the method according to the present disclosure makes it possible to check the plausibility of tickets arriving at the field device in relation to the system time of the field device and/or the system time of the ticket server. A ticket is a digital, tamper-proof data package that, in addition to a signature of the unit issuing the ticket, for example, a ticket server, contains additional data. The additional data, for example, if the ticket is an order ticket, are an authorization for the operating unit to carry out defined tasks on the field device. In addition to the authorization for this task, the ticket can also contain, for example, a valid value range for the field device parameters to be written. By means of the signature, the recipient of the ticket is enabled to check the authenticity and integrity of the ticket. For this verification, the field device requires a cryptographically relevant piece of information of the ticket server. The cryptographically relevant information is, for example, the public keys of a key pair (wherein the key pair consists of a private key, which is written to the field device, and the respective corresponding public key). Alternatively, it is information that is required for so-called "challenges" by means of which the field device and the ticket server establish a trust relationship.

If the first date or first time and the second date or second time differ by the predetermined factor so that the warning message is generated, there is a plausibility problem. This can be caused, for example, by the fact that the transport route of the ticket is too long, so that the first date or the first time is more than the predetermined factor before the second date or the second time. Another cause can be found in the fact that the first time recording unit of the field device develops a deviation so that the first date or first time is more than the predetermined factor before or after the second date or second time.

The first time recording unit of the field device is in particular a real time clock (RTC) or an operating hours counter. The second time recording unit is, in particular, an accurate real time clock.

The warning message can be sent back to the unit that issued the original ticket, for example in the form of a return ticket. It can also be provided to display the warning message on a display of the field device or by means of a visual indicator, e.g., a flashing display or LED of the field device. It can also be provided to output the warning message via a fieldbus interface or a local interface of the field device.

Field devices that are cited in connection with the method according to the present disclosure are already listed as examples in the introductory part of the description.

One version of the method provides that the warning message is only created if the time stamp of the ticket is younger than the time stamps of all tickets received by the field device to date. In this case, the transfer route of the ticket to the field device is taken into account. This assumes that the time stamps of the tickets received so far are correct. Tickets that experience a long delay on the transfer route and contain outdated commands or information are thereby detected. In addition to the warning message, an action can be carried out, such as not allowing the execution f the commands contained in the ticket in question.

According to one embodiment of the method, it is provided that the trust assessment is only carried out in the event that the field device can successfully verify the cryptographically secured information. As a result, manipulation by third parties can be prevented.

According to a first variant of the method, the ticket is created by a ticket server, wherein the ticket server transmits the ticket to the field device, wherein the second time recording unit is assigned to the ticket server, wherein the second time recording unit assigned to the ticket server has a higher trust assessment than the first time recording unit of the field device. Thus, it is assumed that the second time recording unit has more correct or more accurate information than the first time recording unit.

One embodiment of the first variant of the method provides that the transmission of the ticket is carried out via an operating unit by the ticket server transmitting the ticket to the operating unit and by the operating unit transmitting the ticket to the field device. Alternatively, the ticket can be transmitted via a storage medium such as a USB stick.

According to a second variant of the method, the ticket is created by an operating unit, wherein the operating unit transmits the ticket to the field device, wherein the second time recording unit is assigned to the operating unit, and wherein the second time recording unit assigned to the operating unit only has a higher trust assessment than the first time recording unit of the field device if the operating unit has already been made known to the field device. As a result, manipulation by third parties is prevented. Advantageously, it can be provided that the ticket server has transmitted a certificate to the operating unit as proof of being a trustworthy time source, wherein the operating unit incorporates the certificate into the ticket and transmits it to the field device, wherein the field device only performs the steps following receipt of the ticket if the field device FG can successfully verify the certificate.

A further development of the method provides that first time recording unit is reset to the second date or the second time if the second date or the second time fulfills at least one plausibility condition. As a result, a timing discrepancy of the first time recording unit of the field device can be not only detected but also corrected.

In particular, it is provided that a third time recording unit is assigned to the operating unit, wherein the operating unit transmits the ticket to the field device together with a third date and/or third time obtained from the third time recording unit, wherein the plausibility condition is fulfilled in the event that the third date and/or the third time substantially matches the second date or the second time. Here, the plausibility check is undertaken by the field device. As a result, inaccurate time information, which can be caused by delays on the transfer route between the ticket server and the field device, is not taken into account for the new time of the field device. "Substantially" depends on the specific requirement for the accuracy of the time or date of the field device. If, for example, the first date of the field device needs to be corrected to the exact day, the second date and the third date must match. If the first time of the field device is to be corrected, the second time and the third time must match to the minute, for example.

According to one embodiment of the method, a mobile device, in particular a tablet or smartphone, is used as the operating unit.

In particular, it is provided that the operating unit transmits the ticket to the field device via a wireless communication connection, in particular based on Bluetooth or WiFi. However, other suitable communication protocols or standards can also be used.

BRIEF DESCRIPTION OF THE DRAWINGS

The present disclosure is explained in greater detail with reference to the following FIGURE. In the FIGURE:

FIG. 1 shows an exemplary embodiment of the system according to the present disclosure.

DETAILED DESCRIPTION

With regard to security, the reliability of time stamps is also becoming increasingly important in the application context of industrial control technology, such as central offices and field devices. In this context, field devices FG are understood to mean various types of control technology, such as central offices, controllers, sensors or actuators. The time is becoming increasingly important with field devices FG for various operations and authorization checks. These include in particular: time stamp-based validity checks for cryptographic certificates, as used, e.g., in authentication checks for protocols such as TLS or IPSEC; time-limited granting of access for human users or devices. (e.g.: access for temporary employees); and/or locking instructions (e.g., for removing an access authorization stored in the field device FG for a tablet HMI interface after it has been reported as stolen).

For this purpose, the field device FG has a first time recording unit RTC1, which supplies the field device FG with a first time and/or a first date.

A particular challenge is posed by field devices FG that do not have a permanently available online connection and receive asynchronous instructions from a central office via certificates or TI tickets or can access network time synchronization protocols such as NTP (RFC 958). Within the meaning of this application, the term "central office" is understood to mean in particular to so-called certificate-issuing authorities, as they are known in the context of the Internet under the term "certificate authority" (CA), among other things. In the present case, a ticket server TS, which is localized in the system network, for example, forms such a central office.

It is substantial for the use of a ticket-based system that a position of trust is established between the central office and the field device FG during commissioning of the field device FG, so that the field device FG can be configured in such a way that certificates and tickets TI issued by the central office are trusted.

Within the meaning of this application, certificates and tickets TI are understood to mean digitally coded data blocks, which are characterized by the fact that they contain a data area, on the one hand, and a verifiable digital signature regarding the content of this data area by the central office, on the other hand. Within the meaning of this application, signature is understood to mean both conventional cryptographic signatures based on an asymmetric key pair (elliptic curves, RSA, Kyber, MacElice, etc.) and so-called message authentication codes such as (HMAC, CMAC, CBC-MAC, etc.).

For example, if the data area contains information about a public key that is to be considered trustworthy, this is usually referred to as a so-called certificate, which confirms the validity of the key.

If, for example, the data area contains an encoding of an instruction to change a configuration parameter of a field device or to create a user account for an operator on a field device, it would be unusual to speak of a "certificate." This is why the term "ticket" is used in this case. (In many cases, the data area of the ticket would also be additionally encrypted in contrast to certificates).

Such a certificate or ticket TI enables the field device FG to check the authenticity of an instruction contained in the data block by checking the signature field to see whether it was actually created by the central office accepted as trustworthy.

The procedure for such asynchronous communication between a field device is that these certificates/tickets are initially created by the central office, then transferred to a "third party" (e.g., a user on a USB stick or stored on an operating unit BE such as a smartphone or tablet) and then this third party transmits this certificate/ticket to the field device. For example, this can be effected by a user inserting the USB stick with the ticket into the field device and the data of the ticket TI or certificate being read out there or the operating unit being connected to the field device FG and the ticket TI or certificate being transferred.

A substantial factor for this application is the realization that tickets TI within the meaning of this application do not necessarily reach the addressee (a field device) in the order in which they were created and that the first time or first date provided by the first time recording unit RTC1 of the field device FG may be incorrect.

According to the present disclosure, a method for measuring discrepancies between a time stamp of the ticket TI and the current time of the field device FG is implemented in the field device FG. Here, a time stamp is added to the ticket TI by the issuing authority, in this case the ticket server TS. For this purpose, the ticket server comprises a second time recording unit RTC2, which provides the ticket server TS with a second date and/or a second time.

After receiving the TI ticket, the field device FG carries out a trust assessment. For this purpose, limits are initially derived for the minimum and maximum possible valid time for the current time, which are based on assigned trust relationships. For example, it may be useful to assign the following trust priority:

1. Time stamps contained in the certificates/tickets TI issued by the ticket server are given the highest level of trustworthiness. According to this assumption, the actual time cannot be earlier than the issue date of the last verified TI ticket.
2. Subsequent subordinate trustworthiness is granted to certificates of a time transmitter with a valid certificate, in this case the operating unit BE.
3. The time information of the first time recording unit of the field device FG is granted subordinate trustworthiness.
4. Time information from a local operator interface or from unauthenticated sources (obtained via a trustworthy certificate) is assigned the lowest level of trustworthiness.

If the trustworthiness of the time stamp contained in the ticket TI is higher than the trustworthiness of the system time of the field device FG, the system checks whether the second time or date contained in the time stamp differs from the first time or date. If this is the case and the deviation is greater than a predetermined factor, a warning message is created by the field device and output, for example, as a return ticket to the ticket server and/or via the display or fieldbus interface.

Trustworthy time transmitters within the meaning of the present disclosure are devices that have their own clock and to which a certificate is transmitted from the central office, with which they can identify themselves as trustworthy time sources. As a rule, the trustworthy transmitters contain their own asymmetric key pair. The certificate that identifies the trustworthy time transmitter as trustworthy thus contains, e.g., the asymmetric public key of the transmitter and a signature issued by the central office.

Similar to the field device, the trustworthy transmitter can also have its own real time clock, wherein the same restrictions must be applied to the reliability of the trustworthy transmitter in the event of power failures, etc. as for the field device itself.

In the present case, the operating unit is such a trustworthy time source and has a third time recording unit RTC3, which outputs a third date and/or a third time.

The operating unit BE can add its own time stamp to the TI ticket. After the warning message has been created, the field device FG can carry out a plausibility check and compares both time stamps contained in the ticket, i.e., the second time or date and the third date or time. If these essentially match, the field device FG resets the first time or the first date of the first time recording unit RTC1 to the second date or the second time.

In the following, the method according to the present disclosure will be explained in more detail using three examples:

In the first example, the field device FG has a battery-buffered real time clock as the first time recording unit RTC1. This was set to a first date on 01.01.2024 via a local operating unit on the field device FG: 01.01.24. The date thus refers to the year 24 AD, so that the date is erroneously incorrect by approximately 2000 years.

The field device FG receives a ticket TI created by the ticket server TS. This has a time stamp that contains a second date obtained from the second time recording unit RTC2 of the ticket server: 12.12.2024.

The field device FG checks the trustworthiness of the time stamp. Since the time stamp originates from the ticket server TS, and thus from the unit with the highest trustworthiness level, the time stamp is trusted, since the trustworthiness of the manually set first date is lower.

The time deviation is very high (>2000 years), wherein a comparison factor is only one day. The field device FG creates a warning message with respect to the first date.

In the second example, the field device FG has a battery-buffered real time clock as the first time recording unit RTC1. This should have a maximum timing deviation of +/−5 minutes per day. The current first date is 03.05.2023, the current first time is 02:15.

The field device FG receives a ticket TI created by the ticket server TS. It has a time stamp that contains a second date (05.03.2023) and a second time (02:24) obtained from the second time recording unit RTC2 of the ticket server.

The field device FG checks the trustworthiness of the time stamp. Since the time stamp originates from the ticket server TS, and thus from the unit with the highest trustworthiness level, the time stamp is trusted, since the trustworthiness of the time of the first time recording unit is lower.

The time deviation is more than five minutes, whereupon the field device FG creates a warning message with respect to the first date.

For both examples, it can be provided that the operating unit BE serves as a transport means of the ticket TI and adds a further time stamp with a third date and/or a third time to the ticket. After creating the warning message, the field device FG carries out the plausibility check and resets the clock if the remaining time stamp is within defined limits (first example: 1 day; second example: 1 minute).

In the third example, the field device FG has a battery-buffered real time clock as the first time recording unit RTC1. This should have a maximum timing deviation of +/−1 minute per day. The current first date is Mar. 8, 2023, the current first time is 9:17 am. The clock RTC1 was last set on Mar. 1, 2023 on the basis of a trustworthy time transmitter and this event was recorded in a logbook of the field device FG.

A connection to the field device FG is established via Bluetooth using a operating unit BE. The operating unit is identified as a trustworthy time transmitter by a certificate from the central unit (the TS ticket server).

In the course of creating the credential as a trustworthy time transmitter, the operating unit BE was informed that a trustworthy time synchronization server exists in the system, e.g., based on a cryptographically secured protocol of the NTP protocol family.

The operating unit BE has a second time recording unit RTC2 in the form of a battery-buffered real time clock with a maximum timing deviation of +/−10 seconds per day. The second time recording unit RTC2 is synchronized periodically once a day using the information from the NTP time server designated by the central office, for the last time on Mar. 6, 2023, 00:00. The current second time of the second time recording unit RTC2 is 9:12, the current second date is Mar. 6, 2023.

The operating unit transmits its time to the field device with the information on an expected tolerance of the time RTC2, together with the certificate for identification as a trustworthy time transmitter.

The field device FG checks the certificate that identifies the BE as a trustworthy time transmitter and, based on the transmitted information, determines that the second time has a higher degree of trustworthiness and accuracy than its own first time. Furthermore, it is determined that the deviation of the second time from the first time of 5 minutes within the scope of the timing deviation (7 days at 1 minute per day=+/−7 min. expected tolerance) is plausible and there is no reason for generating a warning message. The first time recording unit RTC1 is reset to 9:12 without issuing a warning. The process of automatically resetting the clock carried out is stored together with the identity of the time transmitter in a logbook of the field device FG. Optionally, the internal first time recording unit RTC1 can be recalibrated according to the determined rate deviation (the first time recording unit RTC1 ran too fast, so that a 5-minute error occurred after 7 days from the last setting of the clock).

The invention claimed is:

1. A method for verifying a first time recording unit of a field device of automation technology, wherein the first time recording unit supplies the field device with a first date and/or with a first time, comprising:

receiving a ticket at the field device, wherein the ticket comprises at least cryptographically secured information and a time stamp, wherein the time stamp is obtained from a second time recording unit, and wherein the time stamp contains a second date and/or second time;

carrying out a trust assessment of the time stamp contained in the ticket, wherein the trustworthiness of the second time recording unit is checked against the first time recording unit in the course of the trust assessment;

in the event that the trust assessment shows that the second time recording unit is more trustworthy than the first time recording unit:

comparing the first date or the first time with the second date or the second time, and creating a warning message if a deviation greater than a predetermined factor is determined between the first date or first time and the second date or second time.

2. The method according to claim 1, wherein the warning message is only created if the time stamp of the ticket is younger than the time stamps of all tickets received by the field device to date.

3. The method according to claim 1, wherein the trust assessment is only carried out in the event that the field device can successfully verify the cryptographically secured information.

4. The method according to claim 1, wherein the ticket is created by a ticket server, wherein the ticket server transmits the ticket to the field device, wherein the second time recording unit is assigned to the ticket server, wherein the second time recording unit assigned to the ticket server has a higher trust assessment than the first time recording unit of the field device.

5. The method according to claim 4, wherein the transmission of the ticket is carried out via an operating unit by the ticket server transmitting the ticket to the operating unit and by the operating unit transmitting the ticket to the field device.

6. The method according to claim 1, wherein the ticket is created by an operating unit, wherein the operating unit transmits the ticket to the field device, wherein the second time recording unit is assigned to the operating unit, and wherein the second time recording unit assigned to the operating unit only has a higher trust assessment than the first time recording unit of the field device if the operating unit has already been made known to the field device.

7. The method according to claim 6, wherein the ticket server has transmitted a certificate to the operating unit as proof of being a trustworthy time source, wherein the operating unit incorporates the certificate into the ticket and transmits it to the field device, wherein the field device only performs the steps following receipt of the ticket if the field device can successfully verify the certificate.

8. The method according to claim 7, wherein a mobile device, in particular a tablet or a smartphone, is used as the operating unit.

9. The method according to claim 8, wherein the operating unit transmits the ticket to the field device via a wireless communication link, in particular based on Bluetooth or WiFi.

10. The method according to claim 6, wherein a third time recording unit is assigned to the operating unit, wherein the operating unit transmits the ticket to the field device together with a third date and/or third time obtained from the third time recording unit, wherein the plausibility condition is fulfilled in the event that the third date and/or the third time substantially matches the second date or the second time.

11. The method according to claim 1, wherein the first time recording unit is reset to the second date or the second time if the second date or the second time fulfills at least one plausibility condition.

* * * * *